(12) United States Patent
Pinney

(10) Patent No.: US 8,817,297 B2
(45) Date of Patent: Aug. 26, 2014

(54) RESTRICTING PRINTER LANGUAGE SELECTION ON A USER-BY-USER BASIS

(75) Inventor: Shaun Pinney, Fremont, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 459 days.

(21) Appl. No.: 12/751,757

(22) Filed: Mar. 31, 2010

(65) Prior Publication Data

US 2011/0242579 A1 Oct. 6, 2011

(51) Int. Cl.
*G06F 3/12* (2006.01)
*G06K 15/00* (2006.01)

(52) U.S. Cl.
USPC .................. 358/1.15; 358/1.14; 358/1.16

(58) Field of Classification Search
USPC ....................... 358/1.14, 1.15, 1.16
See application file for complete search history.

(56) References Cited

U.S. PATENT DOCUMENTS

| 5,475,801 | A * | 12/1995 | Brindle et al. ................ 358/1.15 |
| 7,904,572 | B2 * | 3/2011 | Tadokoro et al. ............. 709/229 |
| 8,150,820 | B1 * | 4/2012 | Herbach et al. ............... 707/705 |
| 2007/0079374 | A1 * | 4/2007 | Yasui et al. ..................... 726/22 |
| 2007/0103712 | A1 * | 5/2007 | Corona ........................ 358/1.14 |
| 2008/0297825 | A1 * | 12/2008 | Hikichi ........................ 358/1.14 |
| 2009/0033490 | A1 * | 2/2009 | Anand et al. .................. 340/541 |
| 2010/0037286 | A1 * | 2/2010 | Cain ................................. 726/1 |

FOREIGN PATENT DOCUMENTS

| JP | 2002-103753 A | | 4/2002 |
| JP | 2004-128549 A | * | 4/2004 |

OTHER PUBLICATIONS

English Language Abstract of JP 2004-128549 A to Tabuki.*

* cited by examiner

*Primary Examiner* — Eric A Rust
(74) *Attorney, Agent, or Firm* — Buchanan Ingersoll & Rooney PC

(57) ABSTRACT

A method implemented in a multi-user data processing system including an image forming apparatus for processing a print job is disclosed, which includes: storing a printer language access policy in the image forming apparatus, wherein the plurality of printer language policy settings determines which printer language commands can be executed by the plurality of users on a user-by-user basis; and when a user requests to execute a printer language command for the image forming apparatus, determining whether the user is authorized to execute the printer language command based on the printer language policy settings for the user, wherein an execution of the printer language command affects at least one of a printer language feature of the image forming apparatus and a printer language setting of a printer language feature of the image forming apparatus to be effective to other users.

20 Claims, 3 Drawing Sheets

RESTRICTING PRINTER LANGUAGE SELECTION ON A USER-BY-USER BASIS

FIELD OF THE INVENTION

The present invention relates to a method or process for user-by-user control of printer based on printer language (command), and more particularly, to a method or process where printer administrators can allow, deny, and/or generally control user access to printer language features on a per-user basis.

BACKGROUND OF THE INVENTION

Image forming apparatuses (or printers) support many different printing languages such as PostScript, PCL (Printer Command Language), and PJL (Printer Job Language). A look at these languages shows that they provide many methods to allow a user to affect how the printer works for subsequent jobs. For example, PCL allows users to download new fonts to a printer so that the new font can be used by subsequent print jobs. In a similar manner, PJL allows users to enable automatic input tray selection for all subsequent jobs. These methods provided by printing language enrich and enhance the user experience by adding useful features and functionality.

However, in an environment with multiple users, unintentional or malicious use of these methods can negatively affect the ability of other users to print. For example, if a user downloads a new font to a PCL printer, another user can issue a PCL command to delete the font and prevent other users from printing documents with the new font. Alternatively, if a user downloads too many fonts to the printer it can fill up the printer's internal storage and prevent other users from uploading new fonts.

Some languages, such as PJL, provide features to attempt to address these issues. However, there can be limitations. For instance, in PJL an optional password can be used to allow or deny a user from setting default values, such as the number of copies to print for all subsequent jobs. However, since the password is not encrypted before being sent and is very short (0-65535), it can be easily determined by a malicious user. Both a simple inspection of the printer's network traffic for the password or a quick test of all possible passwords would allow for full access to the printer's PJL settings. Other languages simply do not provide the necessary security features to address granting, denying, and control of access on a per-user basis.

Accordingly, it would be desirable to address these issues by giving printer administrators the ability to grant, deny, and control access to printer language features on a per-user basis. For instance, one user may be able to download, store, and/or delete PCL fonts to a printer and another user may not be allowed to download, store, and/or delete PCL fonts. In addition, one user may be allowed to delete any selected font and another user may only be allowed to delete fonts which that user himself has downloaded to the printer. In another example, one user may be allowed to change the default value of a PJL variable yet another may not be granted access to change default values. Alternatively, another user may be limited so he may set the default value of only a few specific PJL variables.

It can be appreciated that in accordance with another exemplary embodiment, administrators are provided with a method to allow, deny, and generally control user access to printer language features (e.g. PDLs and PJL) which have an affect on other users. In this way, administrators can prevent unauthorized users from negatively affecting how the printer behaves for other users, either intentionally or unintentionally.

OBJECTS AND SUMMARY

The present invention has been made in consideration of the above issues, and provides an improved image forming apparatus, and to a method or process where printer administrators can allow, deny, and/or generally control user access to printer language features on a per-user basis.

In accordance with an exemplary embodiment, a method implemented in a multi-user data processing system including an image forming apparatus for processing a print job, comprises: (a) storing a printer language access policy in an image forming apparatus, the printer language access policy including a plurality of printer language policy settings for each of the plurality of users having access to the image forming apparatus; (b) when a user requests to execute a printer language command for the image forming apparatus, determining whether the user is authorized to execute such a printer language command based on the printer language policy settings for the user; (c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command.

In accordance with another exemplary embodiment, a computer program product comprising a non-transitory computer usable medium having a computer readable code embodied therein for controlling an image forming apparatus, the computer readable program code configured to cause the image forming apparatus to execute a process for producing a print job, the process comprises the steps of: (a) storing a printer language access policy in an image forming apparatus, the printer language access policy including a plurality of printer language policy settings for each of the plurality of users having access to the image forming apparatus; (b) when a user requests to execute a printer language command for the image forming apparatus, determining whether the user is authorized to execute such a printer language command based on the printer language policy settings for the user (c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command.

In accordance with a further exemplary embodiment, an image forming apparatus comprises: a memory unit, the memory unit having a firmware application which performs the following steps: (a) storing a printer language access policy in an image forming apparatus, the printer language access policy including a plurality of printer language policy settings for each of the plurality of users having access to the image forming apparatus; (b) when a user requests to execute a printer language command for the image forming apparatus, determining whether the user is authorized to execute such a printer language command based on the printer language policy settings for the user; c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command; and a print engine for printing at least one copy of a document from a print job.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
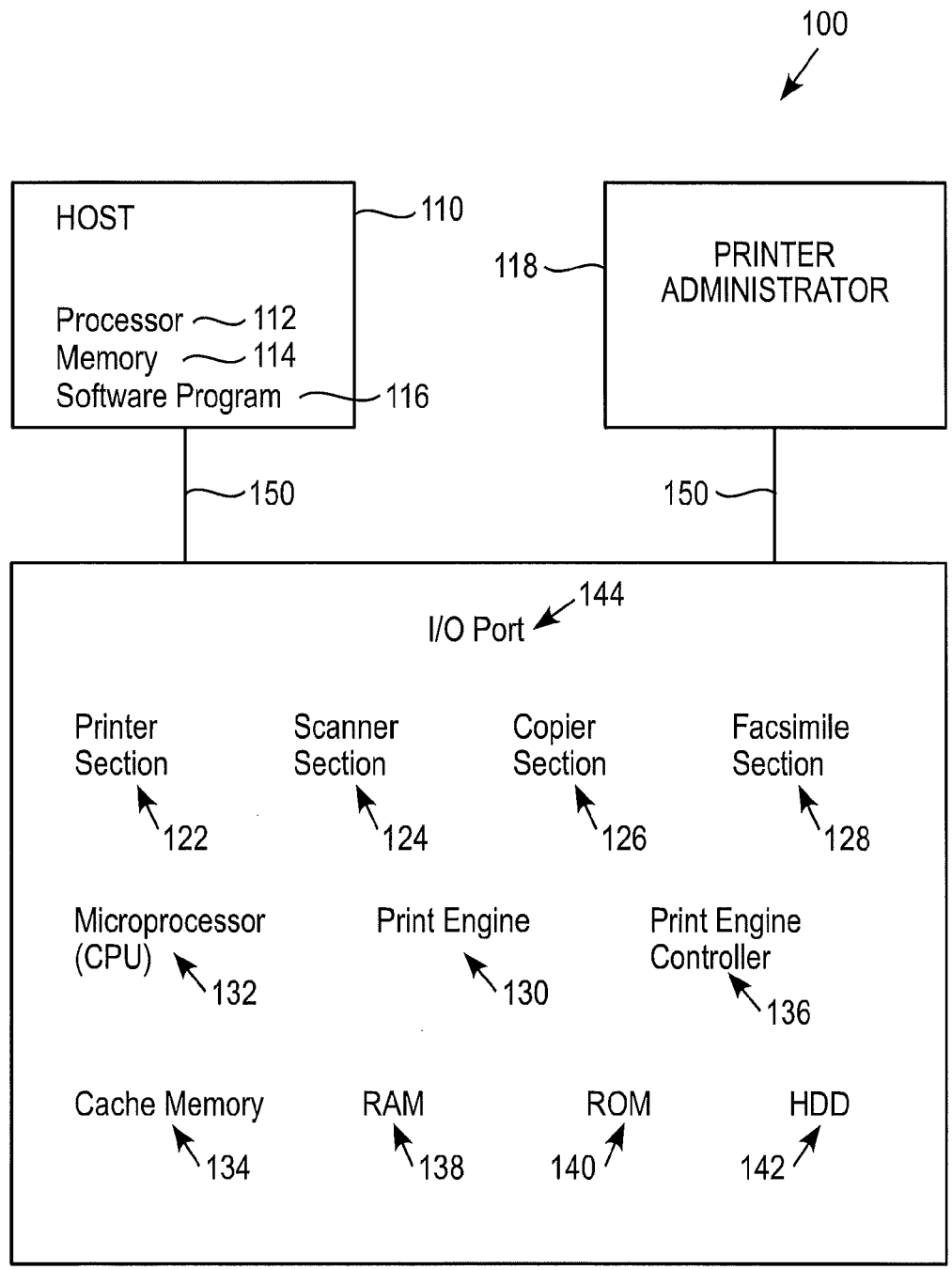
FIG. 1 is a data processing system, which includes a host computer, an image forming apparatus in the form of a printer connected to the host computer, and a printer administrator in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

The methods described herein can be implemented in a data processing system 100 which includes a host (or client device) 110 and an image forming apparatus (or printer) 120 connected to the host 110. A typical structure of the data processing system is shown in FIG. 1. The host 110 includes a processor 112 and one or more memories 114 for storing software programs 116 and data (such as files to be printed). The host 110 submits print jobs to the image forming apparatus or printer 120 by transmitting data representing the documents to be printed and information describing the print job. In accordance with an exemplary embodiment, the host 110 is a personal computer.

It can be appreciated that an administrator (or printer administrator) 118 has the ability to maintain each of the image forming apparatuses 120 within the data processing system 100. The administrator 118 can also be responsible for installing, supporting, and maintaining the image forming apparatuses 118, and planning for and responding to other problems with the system 100. The administrator 118 is preferably connected to the image forming apparatus 120 via a network (or network connection) 150. The network connection 150 between the administrator 118 and the image forming apparatus 120 can be via a host device such as a personal computer or other suitable networking device.

In accordance with an exemplary embodiment, the image forming apparatus (or printer) 120 is configured as a multi-functional peripheral (MFP) device or all-in-one (AIO) that includes a printer section 122 for converting print data inputted from outside to image data and forming and printing out the converted image onto a sheet, a scanner section 124 for optically reading a document, a copier section 126 for coping a document and printing the document, and a facsimile section 128 for facsimile receiving and transmitting image data to and from external apparatuses through public lines.

The printer section 122 carries out a function for forming and outputting an image corresponding to the image data onto the recording sheet using an electro-photographic process. In accordance with an exemplary embodiment, the printer section 122 is configured as a so-called laser printer having a recording sheet conveying device (not shown in the drawing), a photoreceptor drum, a charging unit, an LD (Laser Diode) corresponding to the image data inputted, a scanning unit for scanning the laser light irradiated from the LD on the photoreceptor drum, a developing unit, a transfer and separation unit, a cleaning unit, and a fixing unit.

The scanner section 124, which can include the copier section 126, carries out a function to read a document and obtain the image data and comprises a light source for irradiating the document, a CCD (Charge Coupled Device) image sensor for reading the document by one line at a time in a width direction, and an A/D converter for converting an analogue image signal outputted by the image sensor to digital image data. Although not shown in the drawing, the scanner section 124 further comprises a moving mechanism for moving the reading position per one line of the image sensor in a longitudinal direction of the document and optical parts comprising a lens and a mirror for guiding the reflected light from the document and focusing image on the image sensor.

The facsimile section 128 connects to a public line (not shown) and has a function to compress and expand the image data with the compression mode complying with facsimile, and a function to control various communication protocols for sending and receiving facsimile through the public line.

The image forming apparatus 120 includes a print engine 130, which is controlled by a microprocessor (or CPU) 132. The microprocessor 132 communicates with other elements of the system and includes a cache memory 134. A print engine controller (or printer controller) 136 and the associated print engine 130 provides the print output capability for the printer section 122. A random access memory (RAM) 138 provides a main memory for the printer section 122 for storing and processing a print job data stream received from the client device or host computer 110. A read only memory (ROM) 140 and Hard Disk Drive (HDD) 142 holds firmware which controls the operation of microprocessor 132 and print engine 130. Here, the firmware includes software applications for executing basic controls of various hardware of the image forming apparatus 120, and an embedded Operating System (OS), which controls the operation of the image forming apparatus 120. Code procedures stored in memory (ROM) 140 include, for example, a page converter, rasterizer, compression code, page print scheduler and print engine manager.

An input/output (I/O) port 144 provides communications between the printer section 122 and the host (or client device) 110 and receives page descriptions (or print data) from the host for processing within the image forming apparatus 120. In accordance with an exemplary embodiment, the operation of printer section 122 commences when it receives a page description from the host (or client device) 110 via I/O port 144 in the form of a print job data stream.

In accordance with an exemplary embodiment as shown in FIG. 1, the image forming apparatus (or printer) 120 and the host (or client device) 110 are connected to each other via a network (e.g., LAN or WAN) 150. In accordance with an exemplary embodiment, the image forming apparatus 120 receives a print job from the client device 110, which is then printed onto at least one sheet of paper and/or other printable medium. Examples of the network 150 consistent with embodiments of the invention include, but are not limited to, the Internet, an intranet, a local area network (LAN) and a wide area network (WAN). The image forming apparatus 120 and the host (or client device) 110 can be connected with a wire or be connected with wireless by using radio frequency (RF) and/or infrared (IR) transmission. Examples of image forming apparatuses 120 consistent with exemplary embodiments of the invention include, but are not limited to, a laser beam printer (LBP), an LED printer, a multi-functional laser beam printer including copy function (MFP). In accordance with an exemplary embodiment, the image forming apparatus 120 is preferably a color printer or a black and white (B/W) printer.

Figure 2:
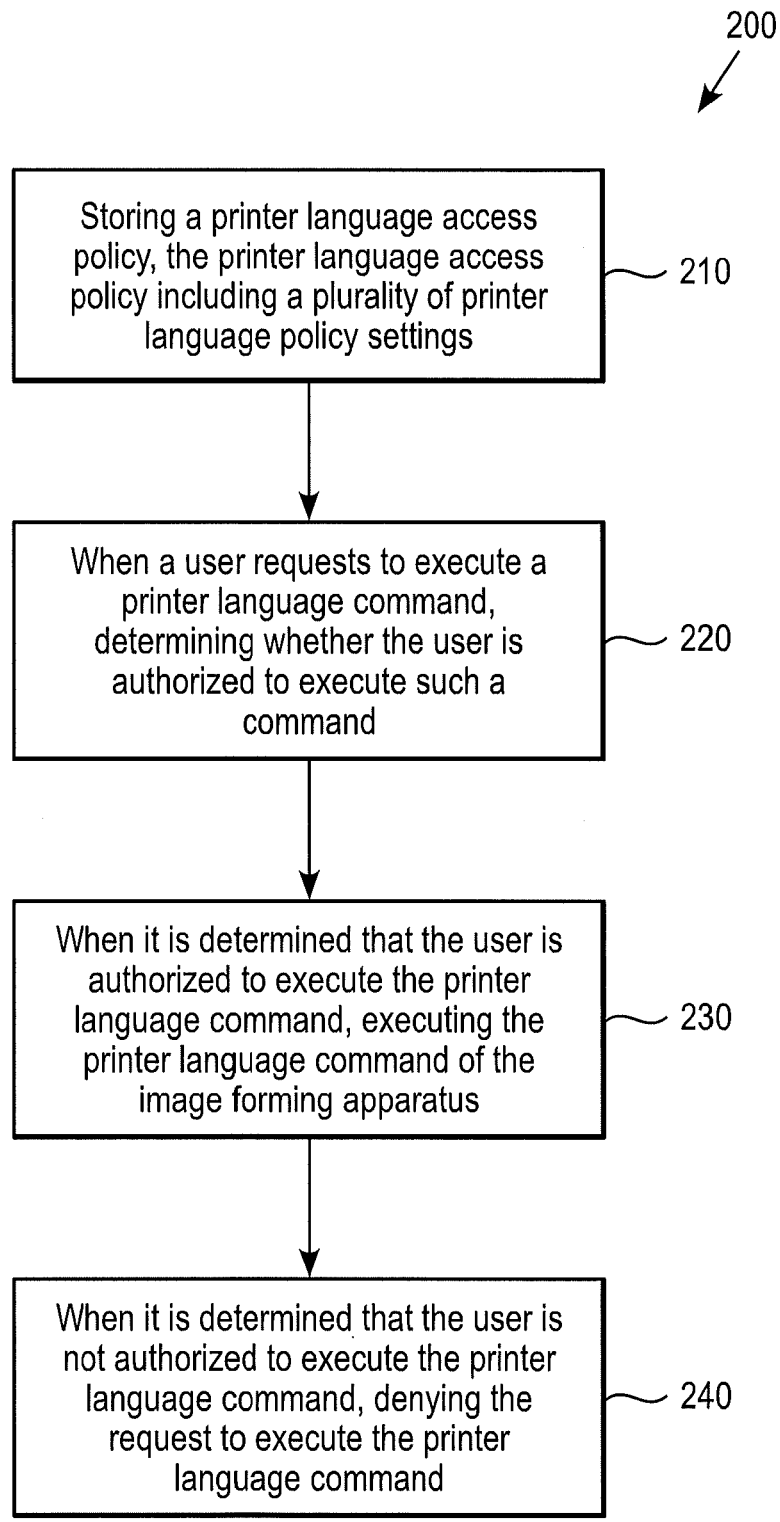
FIG. 2 is a flow chart of a method for user-by-user control of printer based on printer language (command) in accordance with another exemplary embodiment.

In accordance with an exemplary embodiment as shown in FIG. 2, a method 200 implemented in a multi-user data processing system including an image forming apparatus for processing a print job includes the steps of (a) storing a printer language access policy in an image forming apparatus, the printer language access policy including a plurality of printer language policy settings for each of the plurality of users having access to the image forming apparatus 210; (b) when a user requests to execute a printer language command for the image forming apparatus, determining whether the user is authorized to execute such a printer language command based on the printer language policy settings for the user 220; (c) when it is determined that the user is authorized to execute the printer language command of the image forming apparatus, executing the printer language command of the image forming apparatus 230; and (d) when it is determined that the user is not authorized to execute the printer language command of the image forming apparatus, denying the request to execute the printer language command 240.

In accordance with an exemplary embodiment, prior to step (a) 210, an administrator (or print administrator) 118 enters one or more printer language policy settings into the image forming apparatus for each of the plurality of users. The printer language policy settings are preferably entered into the image forming apparatus by the administrator 118 via a user interface on the administrator's host or networking device. However, it can be appreciated that the printer language policy settings can be entered into the image forming apparatus 120 by any suitable method.

In accordance with an exemplary embodiment, the firmware application (and/or software application) within the image forming apparatus controls steps (a)-(d) 210, 220, 230, 240. In addition, steps (c) 230 and (d) 240 can include a method of notifying the user of the authorization or non-authorization of the request to execute a printer language command setting within each image forming apparatus.

In accordance with a further exemplary embodiment, step (b) 220 includes requiring each of the plurality of users to enter an authorization module before access to the printer language of the image forming apparatus 120 is granted. For example, the authorization module can be a login mechanism, which requires each of the plurality of users to have a user identifier (ID) and password (see FIG. 4).

Figure 3:
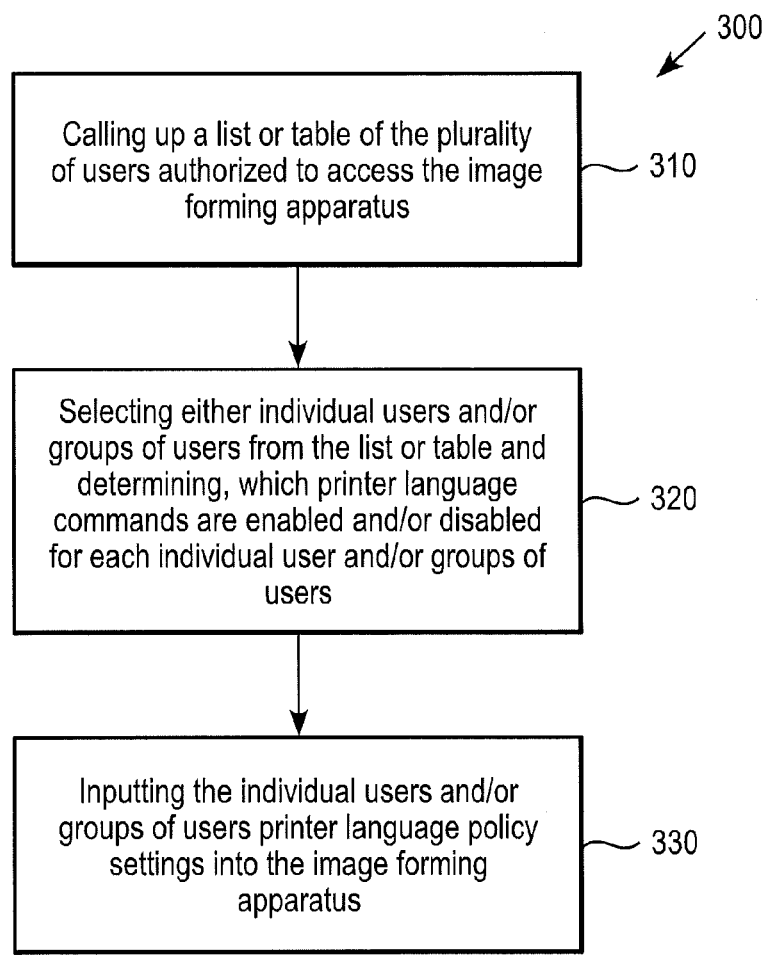
FIG. 3 is a flow chart of a method for user-by-user control of printer based on printer language (command) including steps performed by an administrator to set the printer language policy settings in accordance with an exemplary embodiment.

FIG. 3 is a flow chart of a method 300 for user-by-user control of printer based on printer language (command) including steps performed by an administrator to set the printer language policy settings in accordance with an exemplary embodiment. As shown in FIG. 3, in step 310, the administrator 118 can call up a listing or table of the plurality of users, which are authorized to access the image forming apparatus 120. Once the listing or table of the plurality of authorized users is obtained, in step 320, the print administrator 118 can select either individual users and/or groups of users, and determines which printer language command (or features) are enabled and/or disable for each individual user and/or groups of users. In step 330, the administrator inputs (or enters) the individual users and/or groups of users' printer language policy settings within the image forming apparatus. It can be appreciated that the printer language policy settings for each of the users and/or groups of users can be modified or changed as needed by the administrator 118.

It can be appreciated that the printer language features and the corresponding printer language settings provide the plurality of users with the ability to affect how the image forming apparatus operates and/or prints a print job. In accordance with an exemplary embodiment, the printer languages features can include PostScript, PCL (Printer Command Language) and/or PJL (Printer Job Language) languages. For example, in accordance with an exemplary embodiment, the administrator 118 can control user access to the PCL (Printer Command Language) feature of an image forming apparatus, which allows users to download new fonts to the image forming apparatus (or printer) 120, which fonts can be used by subsequent print jobs. Alternatively, in the printer language PJL, the administrator 118 can allow users on a user-by-user basis to enable automatic input tray selection for subsequent print jobs. It can be appreciated that in accordance with another exemplary embodiment, each printer language policy setting can include an enforcement time period specifying when the specific policy settings are to be enforced.

Figure 4:
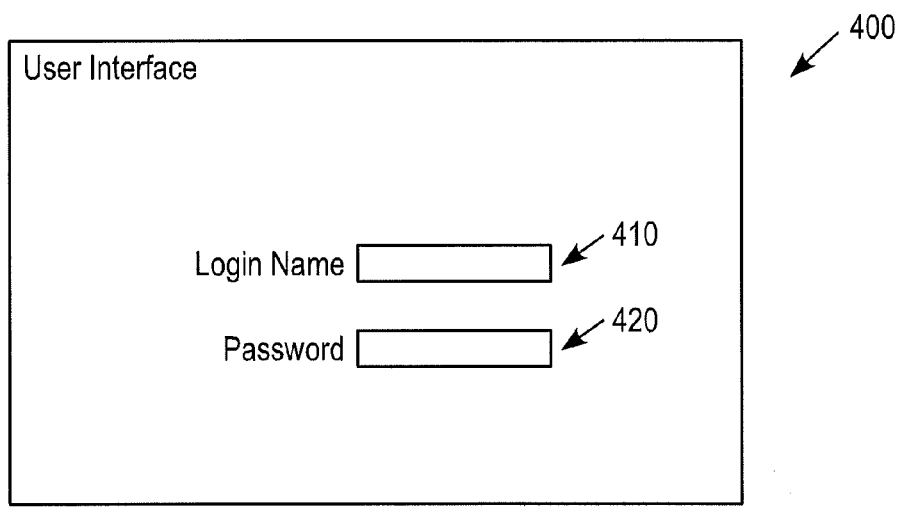
FIG. 4 is an illustration of an authorization module in accordance with a further exemplary embodiment.

FIG. 4 is an illustration of a driver user interface 400 associated with a host device (or client computer) 110, which appears upon a submission of a request by an individual user to execute a printer language command on the image forming apparatus 120. As shown in FIG. 4, the user interface 400 includes an authorization module (or security feature), which requests that the user be authorized to perform the requested operation. In accordance with an exemplary embodiment, the user is identified via a login screen or other suitable identification method, and then a determination is made whether the user is authorized to execute such a printer language command based on the printer language policy settings for the user.

In accordance with an exemplary embodiment, the user interface 400 includes a login name (or user name) window 410 and password window 420. It can be appreciated that the authentication method can include any suitable method or security feature having a permanent or semi-permanent password including single-use passwords, security tokens, access controls based on public key encryption, biometric methods based on unalterable personal characteristics, (e.g., fingerprints, irises, etc.), single sign-on, envaulting technology (e.g., removable storage devices such as flash drives, which provide access control based on the user's access to a network source, non-text-based passwords, such as graphical passwords or mouse-movement, 2D Key (2-Dimensional Key), and/or cognitive passwords.

Once the at least one user has been authorized by the image forming apparatus 120, the firmware within the image forming apparatus will determine the printer language policy settings for each of the users. It can be appreciated that the printer language policy settings for each of the users will determine which printer language settings (or features) can be modified, altered and/or changed for each of the plurality of users. Thus, the ability to download, store and delete fonts;

change or set default values; and generally alter and/or change printer language setting (or features) are based on the printer language policy settings for each of the users on a per-user basis.

It can be appreciated that the default values (or settings) of an image forming apparatus can include settings related to: fonts, page format and spacing, number of print copies, tray selection and/or assignment, hard drive and/or memory, printing a single page of a document, the entire document, or a range of pages in the document; printing multiple copies of a document; printing the pages in a document in reverse order; printing multiple pages of a document on a single page of paper; landscape and portrait printing, printing on different page sizes, printing labels, duplex printing where both sides of a page are printed, and/or printing with watermarks. In addition, the default values (or settings) can include settings related to: page length for front and rear tractor, skip over perforations, auto tear off, auto line feed, print direction, software 0 slash, I/F (interface) mode, Auto I/F (interface) wait time, parallel I/F bidirectional mode, packet mode, character tables including international character set for italic table, manual feed wait time, buzzer, and Auto CR (carriage return).

In addition, it can be appreciated that not all of the printer language settings are modifiable and/or can be altered or changed by a user. For example, in accordance with an exemplary embodiment, the printer language access policy can include a list or table of those printer language settings, which can be modified, altered and/or changed; and a list or table of those printer language settings, which cannot be modified, altered and/or changed.

The printer language policy settings for each of the plurality of users can also include operations within the scanner section 124, the copier section 126, and the facsimile section 128 of the image forming apparatus 120. For example, the printer language policy settings can control access to the memory and hard drive of the image forming apparatus 120 for each of the plurality of users; control storage, printing and/or deletion of print, scan, copy and facsimile jobs within the memory and hard drive of the image forming apparatus 120; and control access to certain documents or images stored within the image forming apparatus 120.

It can be appreciated that in accordance with another exemplary embodiment, a host (or client device) 110 can be assigned a printer language access policy, which is based on user access to the host (or client device) 110. For example, the host or client device 110 can include a list of authorized users, which have access to the host (or client device) 110, and which subsequently allows the user access to the printer language commands of the image forming apparatus.

In accordance with another exemplary embodiment, a computer program product comprising a non-transitory computer usable medium having a computer readable code embodied therein for controlling an image forming apparatus, the computer readable program code configured to cause the image forming apparatus to execute a process for producing a print job, the process comprising the steps of: (a) storing a printer language access policy in an image forming apparatus, the printer language access policy including a plurality of printer language policy settings for each of the plurality of users having access to the image forming apparatus; (b) when a user requests to execute a printer language command for the image forming apparatus, determining whether the user is authorized to execute such a printer language command based on the printer language policy settings for the user; (c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command.

It can be appreciated that the process and method can be introduced into the apparatus by updating the firmware in the non-volatile memory of the image forming apparatus. In this regard, the method may be brought to the apparatus in a form of a package of install software and the firmware, which may be divided and/or compressed so that the install software effectively installs the firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

While a print job is described in detail above, the method and process can also be applied to a copy job, where a user supplies an original hard copy. Thus, as used in this disclosure and the appended claims, the term "image forming apparatus", "printer" or "printing device" should be broadly understood to refer to any machine that has a print function, including printers, copiers, and all-in-one machines which have printing, scanning and copying functions. The term "printing" similarly includes both printing and copying, i.e., it refers to producing images on a recording medium either from a data received from an external device such as a host computer or from data generated by scanning an original hard copy.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method implemented in a multi-user data processing system including an image forming apparatus for processing a print job, comprising:

(a) storing a printer language access policy in the image forming apparatus, the printer language access policy including a plurality of printer language policy settings for each of a plurality of users having access to the image forming apparatus, and wherein the plurality of printer language policy settings determines which printer language commands can be executed by the plurality of users on a user-by-user basis, wherein the printer language commands are commands of which a syntax is in conformity to a printer language, and wherein the printer language commands are the printer languages and not a process or algorithm implemented by the printer language commands;

(b) when a user requests to execute a printer language command for the image forming apparatus, determining whether the user is authorized to execute the printer language command based on the printer language policy settings for the user, wherein an execution of the printer language command affects the printer language of the image forming apparatus to be effective to other users;

(c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command.

2. The method of claim 1, further including, prior to step (a) entering one or more printer language policy settings into the image forming apparatus for each of the plurality of users by an administrator.

3. The method of claim 2, further comprising:
(e) calling up a list of the plurality of users;
(f) selecting at least one user from the list of the plurality of users; and
(g) entering the one or more printer language policy settings into the image forming apparatus for the at least one user.

4. The method of claim 1, wherein the printer language access policy is set by a printer administrator on a user-by-user basis.

5. The method of claim 1, wherein step (b) includes requiring each of the plurality of users to enter an authorization module before access to the printer language of the image forming apparatus is granted.

6. The method of claim 5, wherein the authorization module is a login mechanism, which requires each of the plurality of users to have a login name and/or user identifier (ID) and password.

7. The method of claim 1, wherein steps (c) and (d) includes notifying the user of the authorization or non-authorization of the request.

8. The method of claim 1, wherein the printer language commands provide the plurality of users with an ability to affect how the image forming apparatus prints a print job.

9. The method of claim 1, wherein the user is located at a host and/or a client device.

10. The method of claim 1, wherein the printer language commands are PostScript, PCL (Printer Command Language) and/or PJL (Printer Job Language).

11. The method of claim 10, wherein the PCL (Printer Command Language) allows users to download new fonts to a printer so that the new fonts can be used by a subsequent print job.

12. The method of claim 10, wherein the PJL allows users to enable automatic input tray selection for a subsequent print job.

13. The method of claim 1, wherein each printer language policy setting includes an enforcement time period specifying when the policy setting is to be enforced.

14. The method of claim 1, further comprising a firmware application within the image farming apparatus, which controls steps (a)-(d).

15. A computer program product comprising a non-transitory computer usable medium having a computer readable code embodied therein for controlling an image forming apparatus, the computer readable program code configured to cause the image forming apparatus to execute a process for producing a print job, the process comprising the steps of:

(a) storing a printer language access policy in the image forming apparatus, the printer language access policy including a plurality of printer language policy settings for each of a plurality of users having access to the image forming apparatus, and wherein the plurality of printer language policy settings determines which printer language commands can be executed by the plurality of users on a user-by-user basis, wherein the printer language commands are commands of which a syntax is in conformity to a printer language, and wherein the printer language commands are the printer languages and not a process or algorithm implemented by the printer language commands;

(b) when a user requests to execute a printer language command for the image forming apparatus, determining whether the user is authorized to execute the printer language command based on the printer language policy settings for the user, wherein an execution of the printer language command affects the printer language of the image forming apparatus to be effective to other users;

(c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command.

16. The computer program product of claim 15, further including, prior to step (a) entering one or more printer language policy settings into the image forming apparatus for each of the plurality of users by an administrator.

17. The computer program product of claim 15, further comprising providing the administrator with a user interface component for setting the printer language access policy for each of the plurality of users.

18. The computer program product of claim 15, wherein the printer language access policy is set by a printer administrator on a user-by-user basis.

19. An image forming apparatus comprising:
a memory unit, the memory unit having a firmware application which performs the following steps:

(a) storing a printer language access policy in the image forming apparatus, the printer language access policy including a plurality of printer language policy settings for each of a plurality of users having access to the image forming apparatus, and wherein the plurality of printer language policy settings determines which printer language commands can be executed by the plurality of users on a user-by-user basis, wherein the printer language commands are commands of which a syntax is in conformity to a printer language, and wherein the printer language commands are the printer languages and not a process or algorithm implemented by the printer language commands;

(b) when a user requests to execute a printer language command for the image forming apparatus, determining whether the user is authorized to execute the printer language command based on the printer language policy settings for the user, wherein an execution of the printer language command affects the printer language of the image forming apparatus to be effective to other users;

(c) when it is determined that the user is authorized to execute the printer language command of the image forming apparatus, executing the printer language command of the image forming apparatus; and (d) when it is determined that the user is not authorized to execute the printer language command of the image forming apparatus, denying the request to execute the printer language command; and a print engine for printing at least one copy of a document from a print job.

20. The image forming apparatus of claim 19, further including, prior to step (a) entering one or more printer language policy settings into the image forming apparatus for each of the plurality of users by an administrator.

* * * * *